United States Patent
Moalem et al.

(10) Patent No.: US 10,527,990 B2
(45) Date of Patent: Jan. 7, 2020

(54) LIQUID ELECTROPHOTOGRAPHIC DOT GAIN DETERMINATION

(71) Applicant: HP INDIGO B.V., Amstelveen (NL)

(72) Inventors: Sasi Moalem, Ness Ziona (IL); Yohanan Sivan, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/098,181

(22) PCT Filed: Jul. 22, 2016

(86) PCT No.: PCT/EP2016/067587
§ 371 (c)(1),
(2) Date: Nov. 1, 2018

(87) PCT Pub. No.: WO2018/014977
PCT Pub. Date: Jan. 25, 2018

(65) Prior Publication Data
US 2019/0146395 A1    May 16, 2019

(51) Int. Cl.
*G03G 15/00* (2006.01)
*G03G 15/11* (2006.01)
*H04N 1/29* (2006.01)

(52) U.S. Cl.
CPC ......... *G03G 15/5037* (2013.01); *G03G 15/11* (2013.01); *G03G 15/5041* (2013.01); *H04N 1/29* (2013.01); *G03G 2215/00042* (2013.01)

(58) Field of Classification Search
CPC ... G03G 15/10–11; G03G 2215/00029; G03G 2215/00037; G03G 2215/00042
See application file for complete search history.

(56) References Cited

U.S. PATENT DOCUMENTS

| | | |
|---|---|---|
| 6,803,933 B1 | 10/2004 | Staelin et al. |
| 7,050,200 B2 | 5/2006 | Sanger |
| 7,123,384 B2 | 10/2006 | Koifman |
| 7,240,988 B2 | 7/2007 | Gardner et al. |
| 7,481,509 B2 | 1/2009 | Staelin et al. |
| 8,212,847 B2 | 7/2012 | Kella et al. |
| 2005/0093907 A1* | 5/2005 | Staelin ............... G03G 15/065 347/15 |
| 2009/0279911 A1* | 11/2009 | Raz ..................... G03G 15/10 399/55 |

(Continued)

FOREIGN PATENT DOCUMENTS

WO    WO-2005043888 A1    5/2005

OTHER PUBLICATIONS

HP Indigo Digital Offset Color Technology, Mar. 7, 2011, <http://www8.hp.com/h20195/v2/GetPDF.aspx/4AA1-5248ENW.pdf>.

(Continued)

*Primary Examiner* — Carla J Therrien
(74) *Attorney, Agent, or Firm* — Michael A Dryja

(57) ABSTRACT

An example method of determining dot gain in a liquid electrophotographic printer is described. The method involves effecting a print operation based on a predetermined digital dot area and measuring an operating current of a binary ink development unit during the print operation. A dot gain between the digital dot area and a physical dot area of a developed image is determined based on a function of the measured operating current.

15 Claims, 8 Drawing Sheets

(56) References Cited

U.S. PATENT DOCUMENTS

2012/0301159 A1\* 11/2012 Takahashi .......... G03G 15/0126
399/27
2016/0080607 A1 3/2016 Horita
2017/0371266 A1\* 12/2017 Moalem ............. G03G 15/0266

OTHER PUBLICATIONS

Mourad, S., Improved Calibration of Optical Characteristics of Paper by an Adapted Paper—MTF Model, Jan. 28, 2007.

\* cited by examiner

LIQUID ELECTROPHOTOGRAPHIC DOT GAIN DETERMINATION

BACKGROUND

In some digital printing systems there can be a discrepancy between a digital dot area—the size of an ink dot intended to be generated by a printing apparatus—and the actual printed dot area created on the printing media. This discrepancy can lead to detrimental effects in the quality of the resultant image. For example, a printer or press generally employs a fixed number of inks (for example, 1, 2, 3, 4, 5, 6, or 7 inks) and mixes different ink dots having different dot areas to achieve many more colors. If the printed dot areas are incorrect, the resulting colors or images appear incorrect.

In order to correct for this discrepancy, a dot gain table may be used to relate a physical dot area printed on a substrate to a digital dot area. To populate this table, a page or swatch may be printed using digital dot areas for each color or ink. The printed dots are then measured. In this manner, a dot gain table is generated, with points between measured points being interpolated from the measured data. In operation, the printing apparatus uses the dot gain table to print a desired dot area. To retain color calibration, the process needs to be repeated for each color separation.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
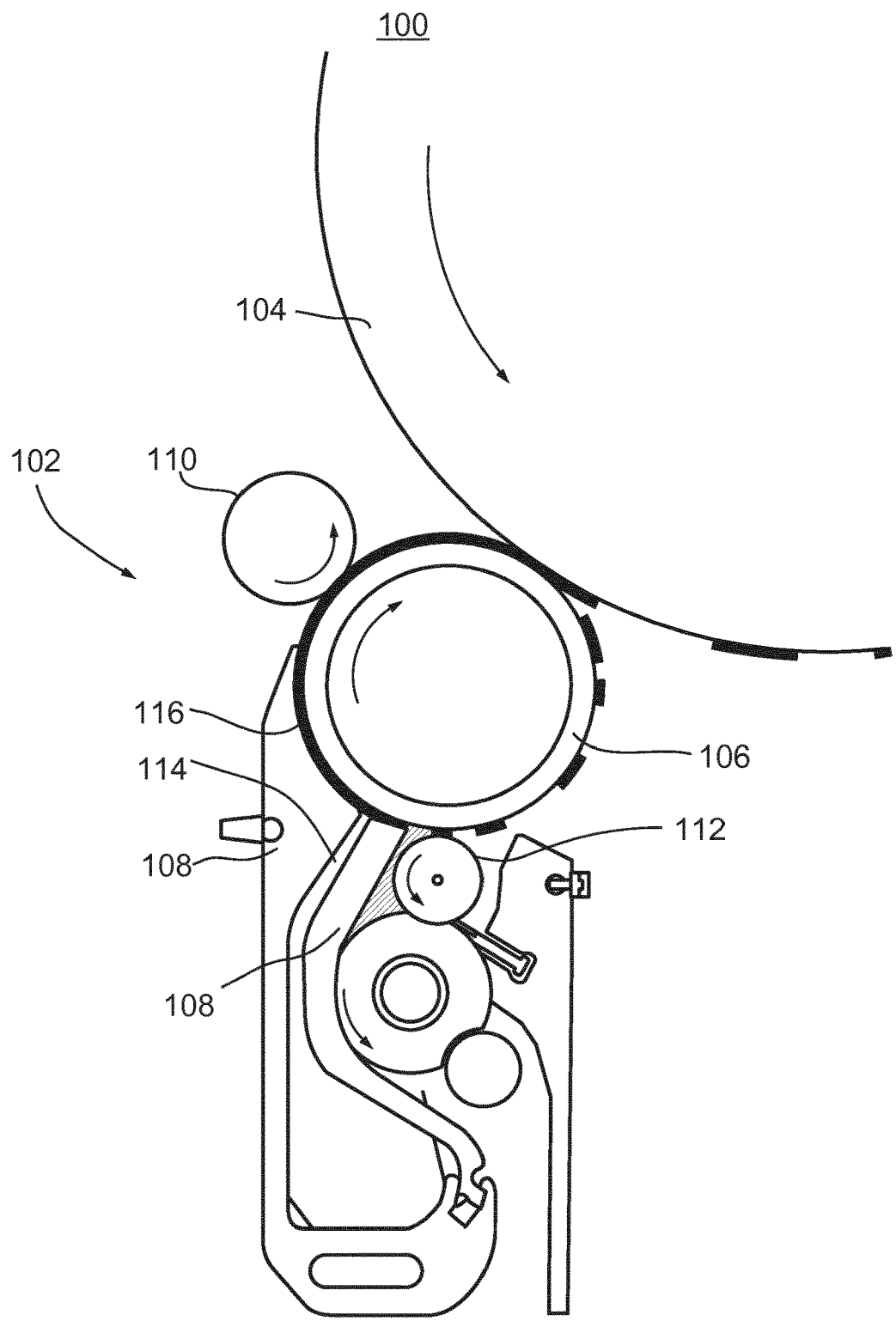
FIG. 1 is a schematic diagram showing a cross section of a printing apparatus incorporating a binary ink development unit according to an example.

FIG. 1 illustrates the components of a print engine 100 in a liquid electrographic printer. The print engine 100 includes a binary ink development unit 102 (referred to hereinafter as a 'BID unit') to develop an ink image on a photo imaging plate 104 (referred to hereinafter as a 'PIP'). The BID unit 102 has a development function that develops the ink onto the photoreceptor and a cleaning function that removes residual ink from the developer roller 106. The BID unit 102 may have several internal rollers and surfaces that are each differentially electrified with voltages.

In the example of FIG. 1, the BID unit 102 includes a developer cylinder 106, an electrode 108, a squeegee roller 110 and a cleaning cylinder 112. Although one BID unit 102 is shown in FIG. 1, the print engine 100 may comprise more than one BID unit 102 and the components of the BID unit 102 may vary between implementations, e.g. in certain implementations squeegee roller 110 may be omitted. In some examples, the print engine 102 may comprise multiple BID units 102 each to transfer a different color ink. For example, the print engine 100 may comprise seven BID units 102.

During a printing operation, the surface of the PIP 104 may be selectively charged to include charged and discharged areas that define a latent electrostatic image. Differential potentials are applied to the developer cylinder 106, the one or more electrodes 108, the squeegee roller 110, and the cleaning cylinder 112 to charge ink particles and create an electric field between the BID unit 102 and the PIP 104.

The developer cylinder 106 may be charged to a voltage which is intermediate the voltage of the charged and discharged areas on the PIP 104. Liquid toner comprising ink particles suspended in an imaging oil, flows through an ink channel 114 to a space between the charged developer cylinder 106 and charged electrode 108. The electrode 108 may be charged to a voltage higher than the voltage to which the developer cylinder 106 is charged. For example, the electrodes may be at a potential of −1200V and the developer cylinder may be at a potential of −400V. The potential difference between the electrode 108 and the developer cylinder 106 may charge the ink particles and cause the charged ink particles to flow to the developer cylinder 106.

Ink particles are deposited on the developer cylinder 106 as a layer of ink particles 116. The optional squeegee roller 110 applies pressure on the developer cylinder 106 to squeeze excess imaging oil out of the layer of ink particles 116 on the surface of developer cylinder 106, further concentrating the ink layer 116. In some examples, the squeegee roller 110 may be charged to a voltage to repel the charged ink particles deposited on the developer cylinder 106. For example, the squeegee may be at a potential of −700V.

The developer cylinder 106 bearing the layer of ink particles 116 engages the PIP 104. The difference in potential between the developer cylinder 106 and the PIP 104 causes selective transfer of the layer of ink particles 116 to the PIP 104 to develop onto the latent electrostatic image, forming an ink image. Depending on the choice of ink charge polarity and the use of a "write-white" or "write-black" system, the layer of ink particles 116 will be selectively attracted to either the charged or discharged areas of the PIP 104, and the remaining portions of the ink layer 116 will continue to adhere to the developer cylinder 106.

The cleaning cylinder 112 may be charged with a voltage potential to strip the remaining portions of the ink layer 116 from the developer cylinder 106 and wrap those remaining portions on the cleaning cylinder 112. For example, the cleaning cylinder 112 may be at a potential of −200V.

Application of voltages to the developer cylinder 106, the electrode 108, the optional squeegee roller 110 and the cleaning cylinder 112, and flow of charged ink particles in the BID unit 102 and from the BID unit 102 to the PIP 104, results in current being drawn by the BID unit 102. The currents drawn by the developer cylinder 106, the electrode 108, the optional squeegee roller 110 and the cleaning cylinder 112 may be measured, as described below with reference to FIG. 2.

Figure 2:
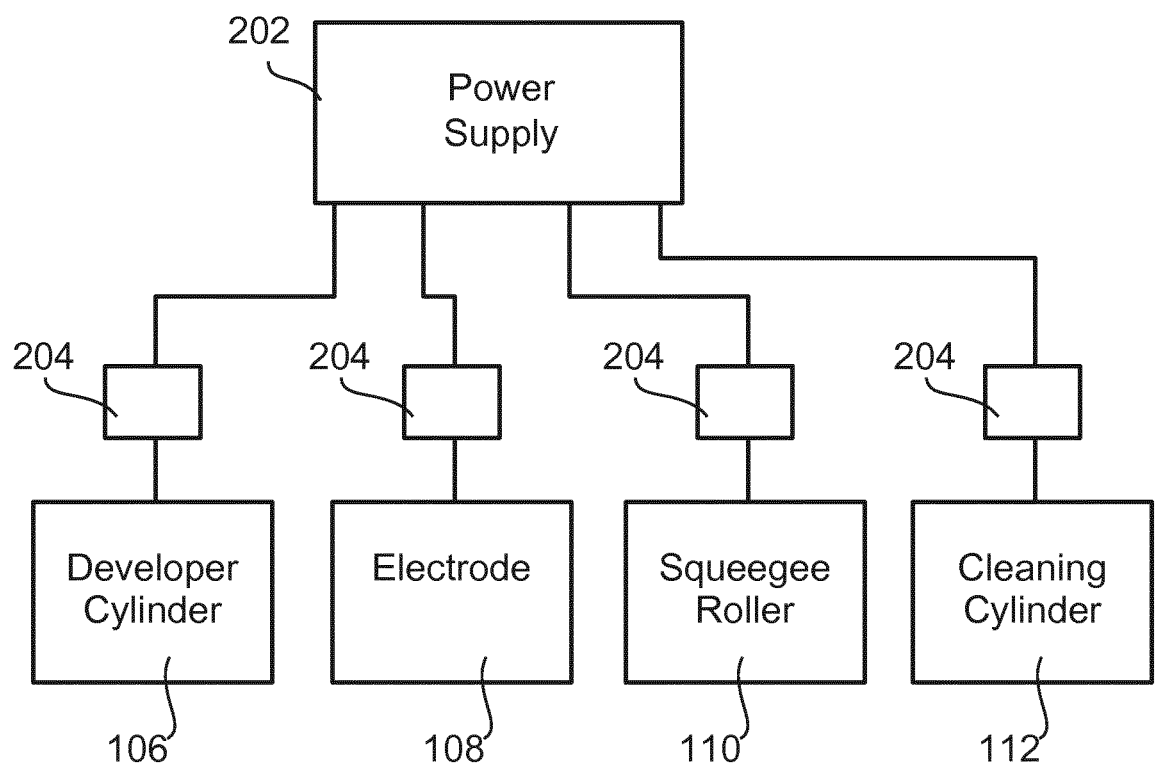
FIG. 2 is a schematic diagram of a power system including current sensors monitoring current drawn from a power supply by components of a binary ink development unit according to an example.

FIG. 2 is a block diagram of a power system 200 including current sensors to monitor the current drawn from a power supply by components of a BID unit 102. One or more power supplies 202 may be used to charge the components of the BID unit 102 such as the developer cylinder 106, the electrode 108, the squeegee roller 110 and the cleaning cylinder 112, at a desired voltage. The current drawn by each of these components may be monitored by a current sensor 204 on their respective power supply and/or power supply channels.

If no ink is transferred to the PIP 104, the net current drawn by the components of the BID unit 102 will be substantially zero since all of the charge transferred to the ink by the electrode 108 and the squeegee 110 will be collected by the cleaning cylinder 112. A net non-zero current drawn by the components of the BID unit 102 is attributable to charge lost from the BID 102 by the flow of charged ink particles to the PIP 104. Therefore, by monitoring the currents measured on the power supplies of the components of the BID unit 102 it is possible to measure the amount of ink that transferred to the PIP 104.

Figure 3:
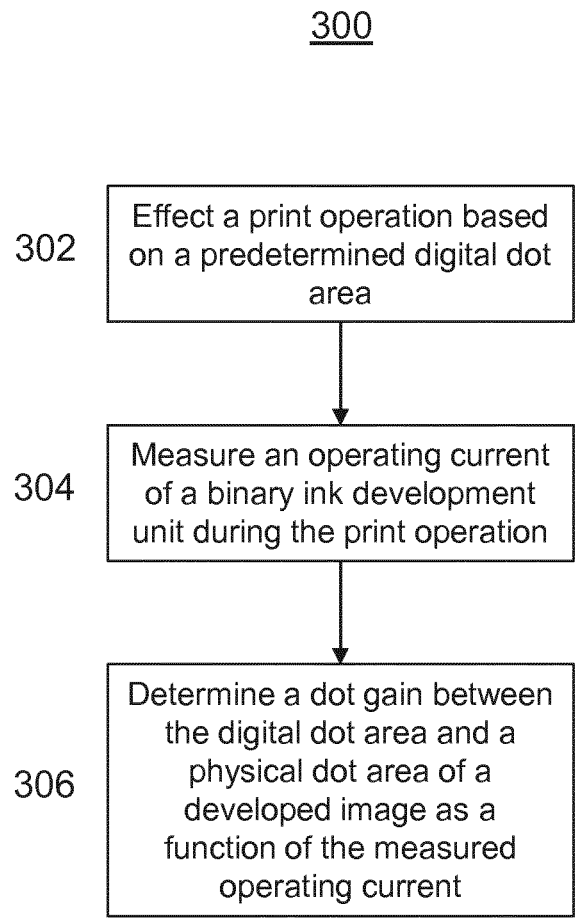
FIG. 3 is a flow diagram illustrating a method of determining dot gain in a liquid electrophotographic printer according to an example.

FIG. 3 is a flow diagram illustrating a method 300 of determining dot gain in a liquid electrophotographic printer, such as an electrographic printer including the print engine 100 illustrated in FIG. 1 and the power supply system 200 illustrated in FIG. 2.

At block 302, a print operation is effected based on a predetermined digital dot area. The print operation may be an operation to transfer ink from the BID unit 102 to the PIP 104. The BID unit 102 may be selected from multiple BID units 102 in the print engine 100 as the unit to be calibrated.

In some examples, the print operation does not involve transport of a substrate through the print engine, or transfer of ink (e.g. in the form of a developed image on the PIP) to a substrate (including transfer from the PIP to the substrate via an intermediate drum or member). In other examples, the print operation may include transport of a substrate through the print engine, and transfer of ink to the substrate.

At block 304, an operating current of the BID unit 102 during the print operation is measured. For example, currents may be measured using the current sensors 204 described above with reference to FIG. 2. In particular, the operating current of the BID unit 102 may be measured as a sum of currents measured for one or more of the components of the BID unit 102.

At block 306, a dot gain between the digital dot area and a physical dot area of a developed image is determined as a function of the measured operating current. The dot gain is a measurement of how the physical dot area, e.g. the area formed by dots in any printed output, differs from an input desired dot area, e.g. a dot area as defined in print instructions from a print driver or print application. In certain examples, a value for the dot gain may be used to adjust operating parameters of the liquid electrographic printer for subsequent print operations such that the physical dot area matches a desired digital dot area (e.g. within a given tolerance). Alternatively, or additionally, print instructions may be modified to reduce the dot gain (e.g. if a dot gain is 20%, a digital dot area may be reduced by 20%).

Figure 4:
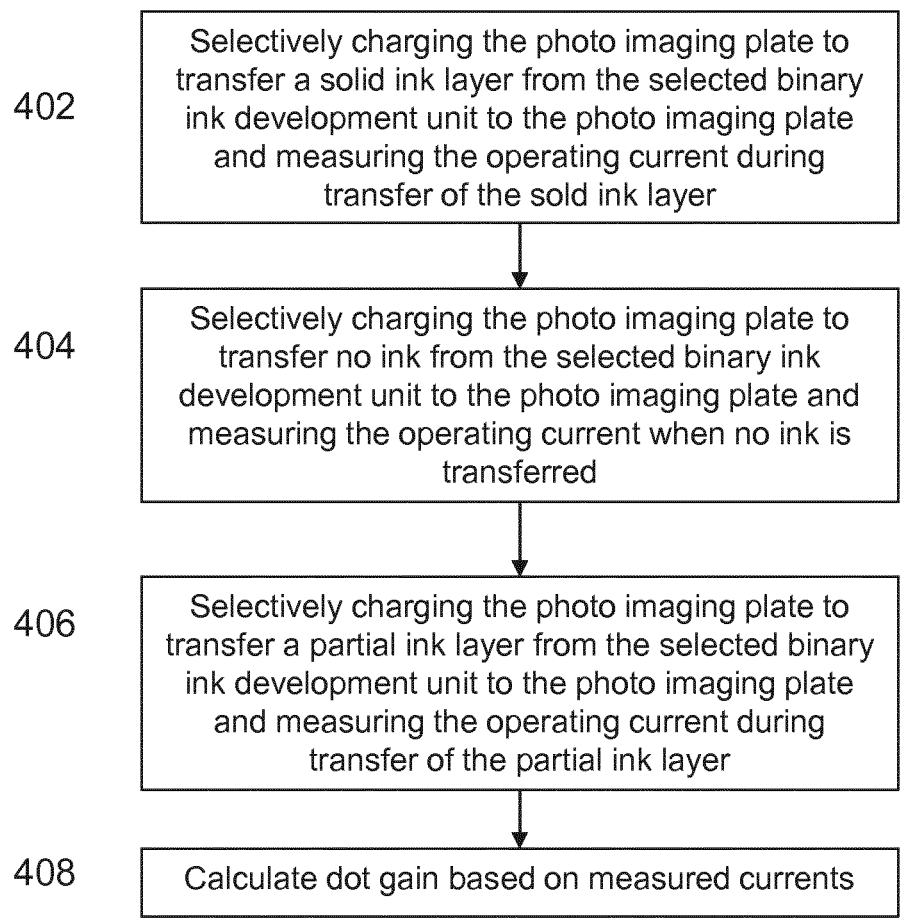
FIG. 4 is a flow diagram illustrating a method of determining dot gain in a liquid electrophotographic printer according to an example.

FIG. 4 illustrates a further method 400 of determining dot gain in a liquid electrophotographic printer according to an example.

At block 402, the PIP 104 is selectively charged to transfer a solid ink layer from the selected BID unit 102 to the PIP 104. At block 402, an operating current, $I_{solid}$, of the BID unit 102 during transfer of the solid layer of ink to the PIP 104, is measured.

At block 404, the PIP 104 is selectively charged to transfer no ink from the selected BID unit 102 to the PIP 104. At block 404, an operating current, $I_{paper}$, of the BID unit 102 when no ink is transferred to the PIP 104, is measured.

At block 406, the PIP 104 is selectively charged to transfer a partial ink layer from the selected BID unit 102 to the PIP 104. The transfer of the partial ink layer is instructed based on a predetermined digital dot area. At block 406, an operating current, $I_{DA}$, of the BID unit 102 during transfer of the partial ink layer to PIP, is measured.

The measurements described with reference to blocks 402, 404 and 406 may be performed in any order.

At block 408, a dot gain, DA, between the predetermined digital dot area and a physical dot area of a developed image is calculated using the currents measured at blocks 402, 404 and 406. The dot gain may be calculated using the formula:

$$DA = \frac{I_{DA} - I_{paper}}{I_{solid} - I_{paper}}$$

In this case, the dot gain is determined as a ratio of: a difference between the operating current during transfer of the partial ink layer and the operating current when no ink is transferred; and a difference between the operating current during transfer of the sold ink layer and the operating current when no ink is transferred.

Figure 5:
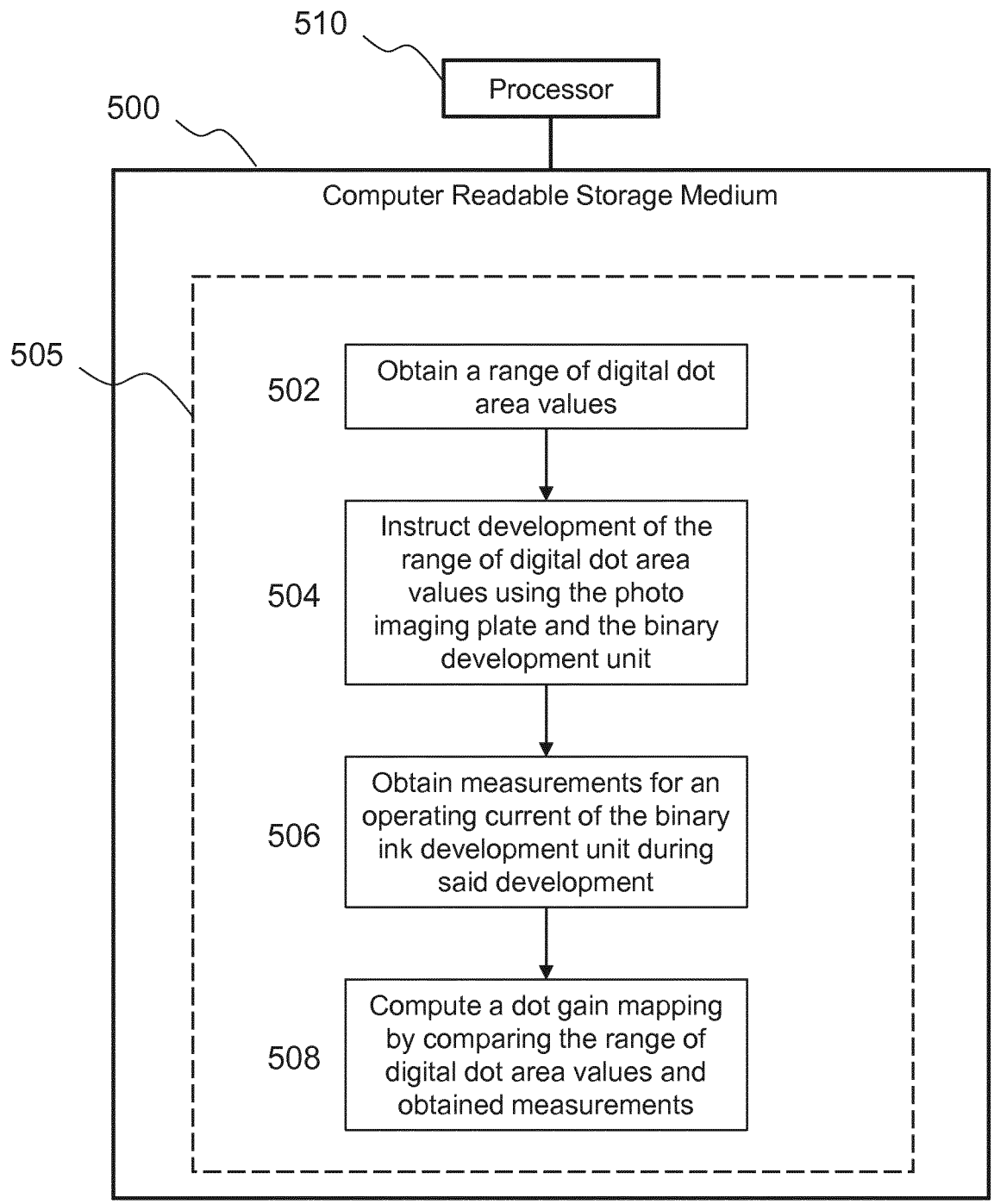
FIG. 5 is a flow diagram illustrating a method of determining dot gain in a liquid electrophotographic printer according to an example.

FIG. 5 shows an example of a non-transitory computer-readable storage medium 500 comprising a set of computer readable instructions 505 which, when executed by at least one when executed by a processor 510 in a liquid electrophotographic printing device, cause the processor 510 to perform a method by which a dot gain mapping may be computed for a range of digital dot area values. In other examples, the method may be performed by an entity other than the processor 510, e.g. without being embodied in computer-readable instruction. The liquid electrophotographic printing device may comprise a device as described above, e.g. comprising a BID unit 102 and a PIP 104. The processor 510 may form part of a print controller. The computer readable instructions 505 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. The processor 510 may perform the method as part of a calibration routine for the liquid electrophotographic printing device.

At instruction 502, a range of digital dot area values is obtained. For example, the range of dot area values may be a plurality of dot area values representing a range of coverage from 0 to 100% (e.g. 11 values at every 10% from 0% to 100% inclusive). These may be retrieved from memory or calculated by the processor 510.

At instruction 504, development of the range of digital dot area values using the photo imaging plate and the binary development unit is instructed.

At instruction 506, measurements for an operating current of the binary ink development unit during said development are obtained. The processor 510 may perform the measurements directly, e.g. based on signals from a power supply such as 202, may obtain the measurements from an accessible memory, or may receive the measurements from another subsystem of the printing device.

At instruction 508, a dot gain mapping is computed by comparing the range of digital dot area values and the obtained measurements. This may comprise generating a look-up table containing values forming part of a representative dot gain curve.

In some examples, an instruction to compute a dot gain mapping may involve computing a function to estimate a difference between a physical dot area and an input digital dot area value. This function may be determine by fitting an equation to computed dot gain values, e.g. fitting a dot gain curve. A dot gain curve may be defined via a logistic function. In one case, an additional transfer function may be determined that relates the dot gain between the digital dot area and a physical dot area of a developed image (e.g. from a dot gain curve determined from the BID current measurements) to the dot gain between a printed dot area and the digital dot area (e.g. from a dot gain curve determined from optical density measurements made upon a printed output). In this case, the latter dot gain may form part of a master dot gain calibration curve for the printing device, e.g. a reference dot gain curve produced from factory or initial calibration data. The transfer function may thus be used to adjust such a master dot gain calibration curve for a particular printing device following operation of the printing device in situ.

In one case, the dot gain between a printed dot area and the digital dot area, e.g. in the form of a reference or master dot gain curve, may be determined by printing on a substrate based on a predetermined digital dot area, measuring a printed dot area of an image printed on the substrate, and determining a measured value of dot gain between the printed dot area and the digital dot area. In this case, a developed image is transferred from the PIP 104 to a substrate.

For example, an optical density, OD, of the printed dots may be measured with a densitometer via a reflectance, R, of the printed dots using the relationship $R=10^{-OD}$. A dot gain value, DA, for a given dot area may be calculated by comparing optical density determined from the reflectance of the paper ($OD_{paper}$), an optical density determined from the reflectance of a solid ink layer ($OD_{solid}$) and an optical density determined from the reflectance of physical dots printed for a given digital dot area given DA ($OD_{DA}$). For example the dot gain, DA, can be calculated using the relationship:

$$DA = \frac{10^{-OD_{DA}} - 10^{-OD_{paper}}}{10^{-OD_{solid}} - 10^{-OD_{paper}}}$$

A first look up table may be created containing dot gain values representing a first dot gain curve, relating the digital dot area values and printed dot areas, based on the optical density measurements.

Based on measurements for an operating current of the binary ink development unit, a second look up table containing dot gain values representing a second dot gain curve relating the digital dot area values to physical dot areas of a developed image may be generated. This second look up table may be generated as part of instruction 508.

In some examples, values of dot gain lying between measured dot gain values may be interpolated from the measured data.

Figure 6:
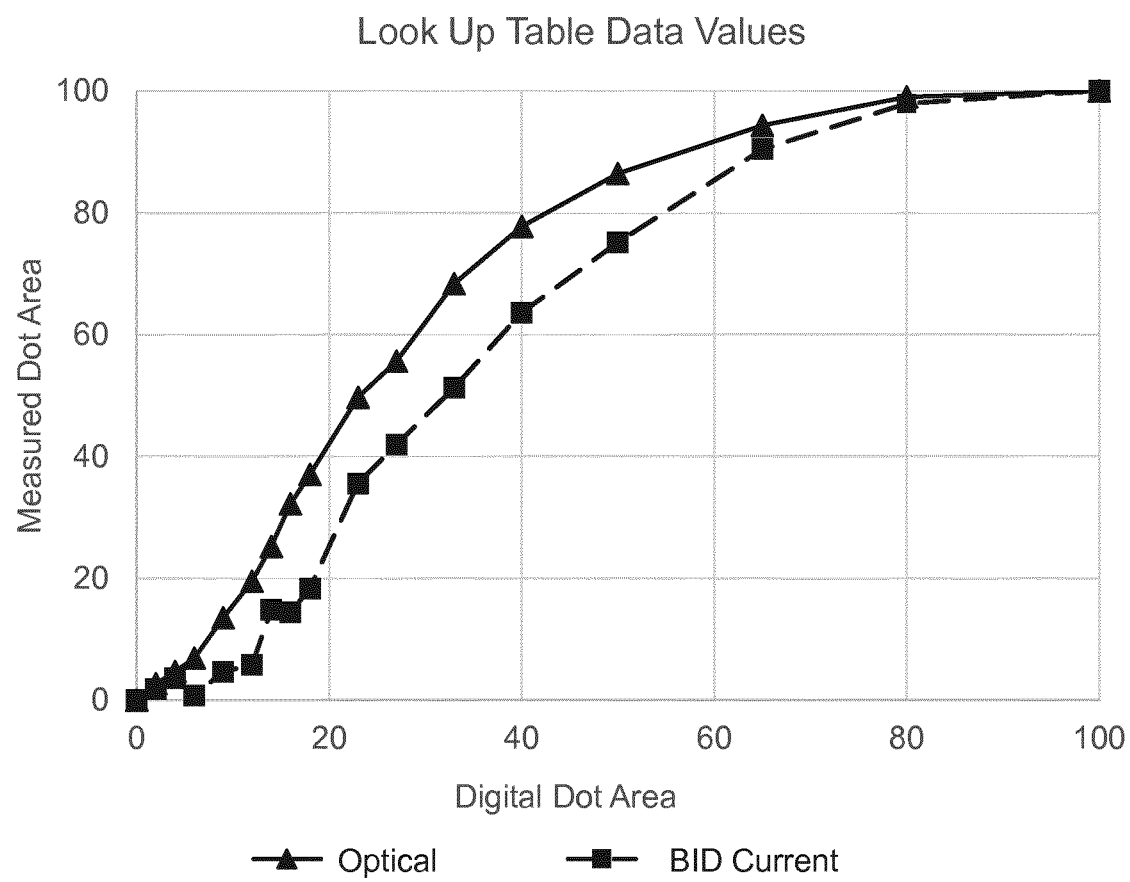
FIG. 6 is a graph depicting example dot gain curves determined based on values of dot gain determined using optical measurements (represented with a solid line and triangular markers), and determined using measurements of current drawn by components of a binary ink development unit (represented with a dashed line and square markers)

FIG. 6 is a graph illustrating dot gain curves that form the basis of the first and second lookup tables, in which measured dot gain is plotted as a function of digital dot gain. The first dot gain curve (represented with a solid line and triangular markers) is measured based on optical density measurements, and the second dot gain curve (represented with a dashed line and square markers) is measured based on measurements of the operating current of the BID unit 102.

As can be seen in FIG. 6, there is a discrepancy between the dot gain curve measured based on measurements of the operating current of the BID unit 102 and the dot gain curve measured based on optical density measurements. This discrepancy may indicate that a current operational dot gain calibration (e.g. in the form of the second dot gain curve) differs from an intended or reference dot gain calibration (e.g. in the form of the first dot gain curve). This may be due to changes in printing device properties over time, e.g. variations in conductivity sensor accuracy, ink aging or batch to batch variation. By computing a transfer function between the two curves, then an adjustment may be made to account for these changes over time.

Figure 7:
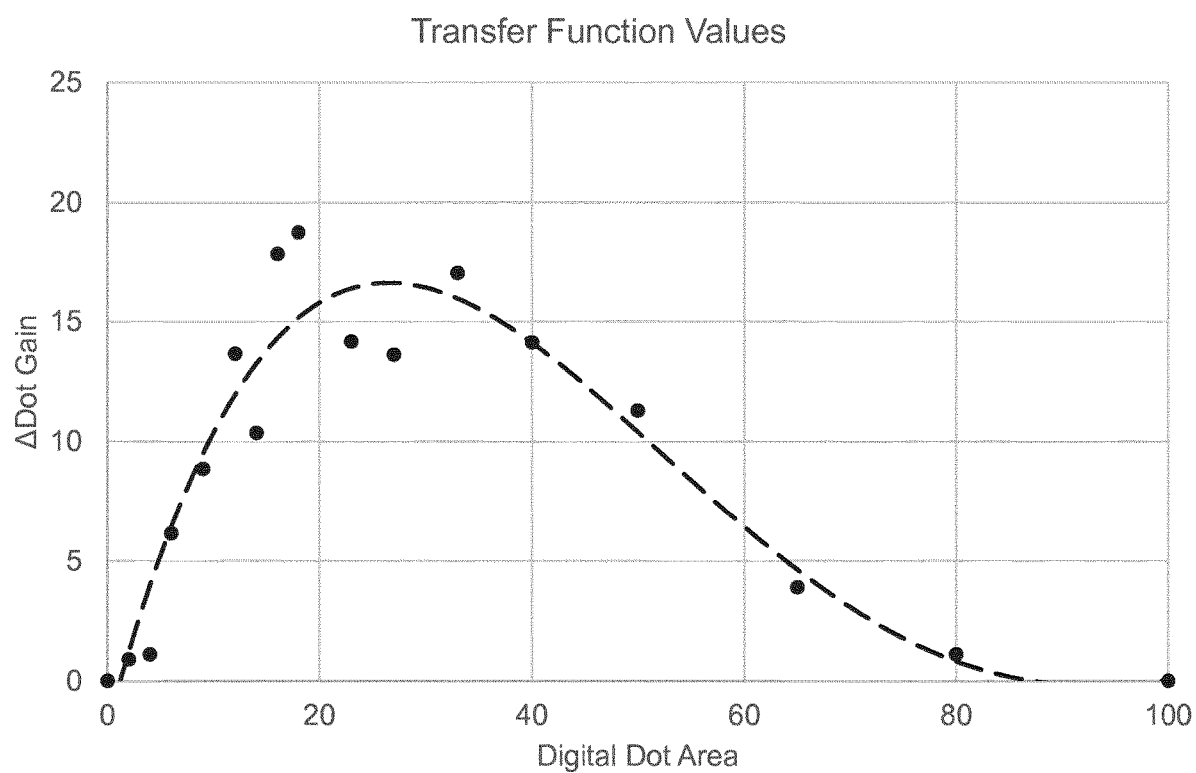
FIG. 7 is a graph plotting an example set of differences between dot gain values determined using optical measurements and dot gain values determined using measurements of current drawn by components of a binary ink development unit.

FIG. 7 is a graph plotting the differences, ΔDot Gain, between values of dot gain derived from optical measurements of printed dot areas and values of dot gain derived from measurements of the operating currents of the BID unit 102, for various values of digital dot area.

To correct this discrepancy, a transfer function relating the dot gain between the digital dot area and a physical dot area of a developed image to the dot gain between the printed dot area and the digital dot area is determined. For example, the transfer function may be determined by fitting a polynomial curve to the data points representing ΔDot Gain plotted against digital dot area, as represented by the dashed line shown in FIG. 7.

The transfer function may then be applied to future values of dot gain measured using an operating current of the BID unit 102. For example, after an initial calibration, the printer may be operated to print for a number of printing operations, or for some period of time, during which parameters of the printer may vary, potentially leading to a loss of dot gain calibration. For example, the conductivity of the ink may change over time.

Periodically, to correct for drift in such printing parameters, a second set of measurements of the operating current of the BID unit 102 may be obtained. A new look up table may be generated by applying the transfer function to dot gain values determined using the second set of measurement of the operating current of the BID unit 102. This means that an initial set of calibrations involve printing on substrate but subsequent calibrations do not require printing on substrate, instead the BID currents may be measured.

Figure 8:
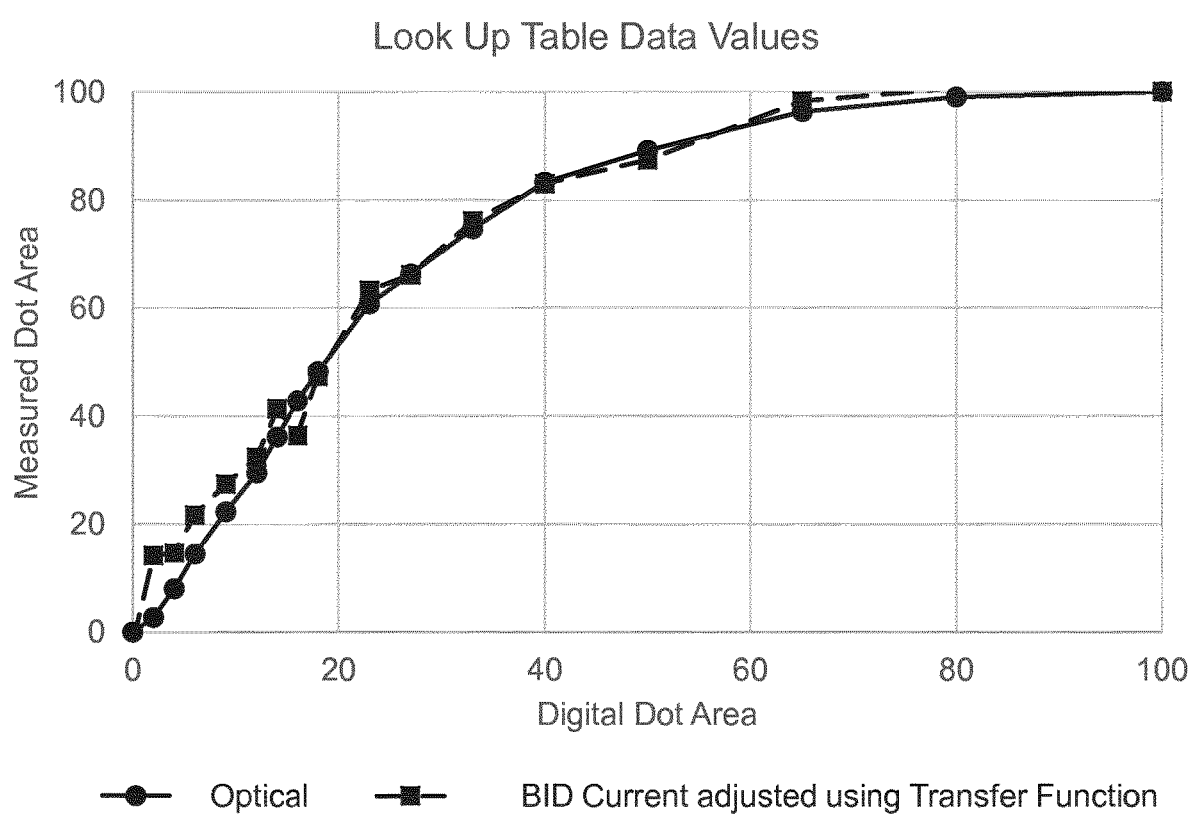
FIG. 8 is a graph depicting example dot gain curves determined based on values of dot gain determined using optical measurements (represented with a solid line and triangular markers), and determined using measurements of current drawn by components of a binary ink development unit (represented with a dashed line and square markers) corrected using a transfer function.

FIG. 8 is a graph illustrating dot gain curves, in which measured dot gain is plotted as a function of digital dot gain. The first dot gain curve (represented with a solid line and triangular markers) is measured based on optical density measurements, and the second dot gain curve (represented with a dashed line and square markers) is measured based on measurements of the second set of measurements of operating current of the BID unit 102, adjusted using the transfer function.

As can be seen from FIG. 8, values of dot gain obtained by applying the transfer function to the values of dot gain obtained using the second set of operating currents of the BID unit 102 provide good agreement with values obtained using optical density measurements. This method therefore provides a method of correcting for changes in dot gain without printing to a substrate or making optical measurements of printed dot areas. Such a method is advantageous in that it provides a quicker and more cost effective method of calibration. In particular, in applications in which expensive substrates are used, or which require continuous printing is required to facilitate compatibility with post printing finishing processes, dot gain and color can be calibrated without printing to a substrate.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of determining dot gain in a liquid electrophotographic printer, the method comprising:
    effecting a print operation based on a predetermined digital dot area;
    measuring an operating current of a binary ink development unit during the print operation; and
    determining a dot gain between the digital dot area and a physical dot area of a developed image based on a function of the measured operating current during ink transfer and the measured operating current when no ink is transferred.

2. The method of claim 1, in which effecting the print operation comprises:
    selecting a binary ink unit;
    applying printing voltages to the selected binary ink development unit;
    selectively charging a photo imaging plate according to the predetermined digital dot area; and
    engaging the selected binary ink development unit with the photo imaging plate.

3. The method of claim 2, wherein the print operation is configured such that a developed image is not transferred from the photo imaging plate to a substrate.

4. The method of claim 2, comprising:
    selectively charging the photo imaging plate to transfer a solid ink layer from the selected binary ink development unit to the photo imaging plate and measuring the operating current during transfer of the solid ink layer;
    selectively charging the photo imaging plate to transfer no ink from the selected binary ink development unit to the photo imaging plate and measuring the operating current when no ink is transferred; and
    selectively charging the photo imaging plate to transfer a partial ink layer from the selected binary ink development unit to the photo imaging plate and measuring the operating current during transfer of the partial ink layer.

5. The method of claim 4, wherein the dot gain is determined using a ratio of:
    a difference between the operating current during transfer of the partial ink layer and the operating current when no ink is transferred; and
    a difference between the operating current during transfer of the solid ink layer and the operating current when no ink is transferred.

6. The method of claim 1, in which measuring an operating current of a binary ink development comprises summing currents drawn by components of the binary ink development unit.

7. The method of claim 1, comprising:
    printing on a substrate based on a predetermined digital dot area;
    measuring a printed dot area of an image printed on the substrate;
    determining a measured value of dot gain between the printed dot area and the digital dot area; and
    determining a transfer function relating the dot gain based on a function of the measured operating current to the dot gain based on the printed image.

8. The method of claim 7, comprising:
    obtaining a subsequent set of measurements for the operating current of the binary ink development unit;
    applying the transfer function to the subsequent of measurements to estimate a current dot gain for the liquid electrophotographic printing device; and
    adjusting an operating parameter of the liquid electrophotographic printing device to reduce the estimated current dot gain.

9. A system to calibrate dot gain in a liquid electrophotographic printer, the system comprising:
    a current sensor to sense an operating current of a binary ink development unit when developing an image on a photo imaging plate according to an input digital dot area, the operating current being a sum of currents drawn by components of the binary ink development unit; and
    a controller to determine a value for a dot gain between the input digital dot area and a physical dot area of the developed image based on the operating current.

10. The system of claim 9, wherein the binary ink development unit comprises at least one of: a developer cylinder; an electrode; a squeegee roller; and a cleaning cylinder.

11. The system of claim 9, wherein the components of the binary ink development unit comprise a developer cylinder, an electrode, a squeegee roller, and a cleaning cylinder.

12. A non-transitory machine-readable storage medium storing instructions that, when executed by a processor in a liquid electrophotographic printing device, the liquid electrophotographic printing device comprising a binary ink development unit and a photo imaging plate, cause the processor to:
    obtain a range of digital dot area values;

instruct development of the range of digital dot area values using the photo imaging plate and the binary development unit;

obtain first dot gain values based on optical density measurements;

obtain measurements for an operating current of the binary ink development unit during said development;

determine second dot gain values based on the measurements for the operating current;

adjust the second dot gain values in comparison to the first dot gain values;

compute a dot gain mapping by comparing the range of digital dot area values and obtained operating current measurements, based on the adjusted second dot gain values.

13. The medium of claim 12, wherein the dot gain mapping comprises a function to estimate a difference between a physical dot area value and an input digital dot area value.

14. The medium of claim 12, wherein the first dot gain values represent a first dot gain curve, and the second dot gain values represent a second dot gain curve based on the measurements for the operating current of the binary ink development unit.

15. The medium of claim 12, wherein said instructions cause the processor to:

obtain a first look up table relating the digital dot area values and printed dot areas, the first look up table being based on optical density measurements;

generate a second look up table using the dot gain mapping; and determine a transfer function relating the first look up table to the second look up table;

wherein the medium further comprises instructions to cause the processor to, at a time following a plurality of print operations using the first look up table:

obtain a subsequent set of measurements for the operating current of the binary ink development unit; and estimate an adjustment to the first look up table by applying the transfer function to the subsequent set of measurements.

* * * * *